Dec. 20, 1966    J. F. MARIOL    3,292,966
TRAILER KITCHEN
Filed Jan. 14, 1965
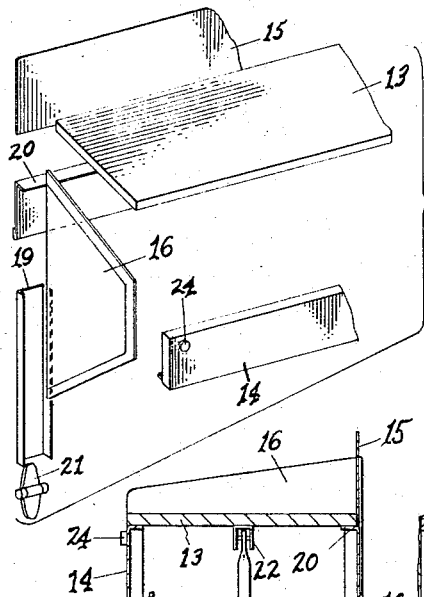
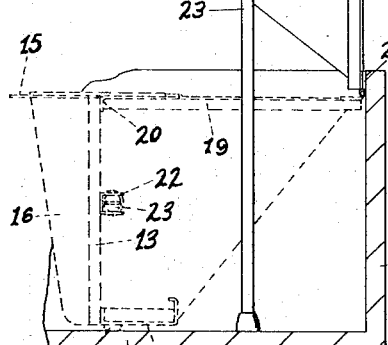
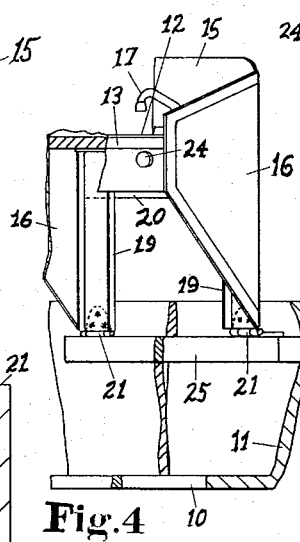
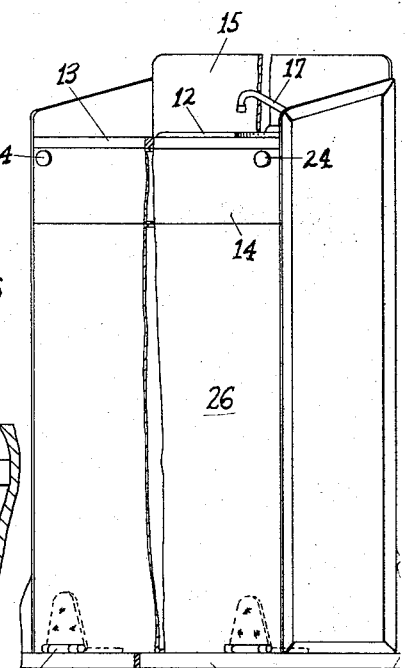
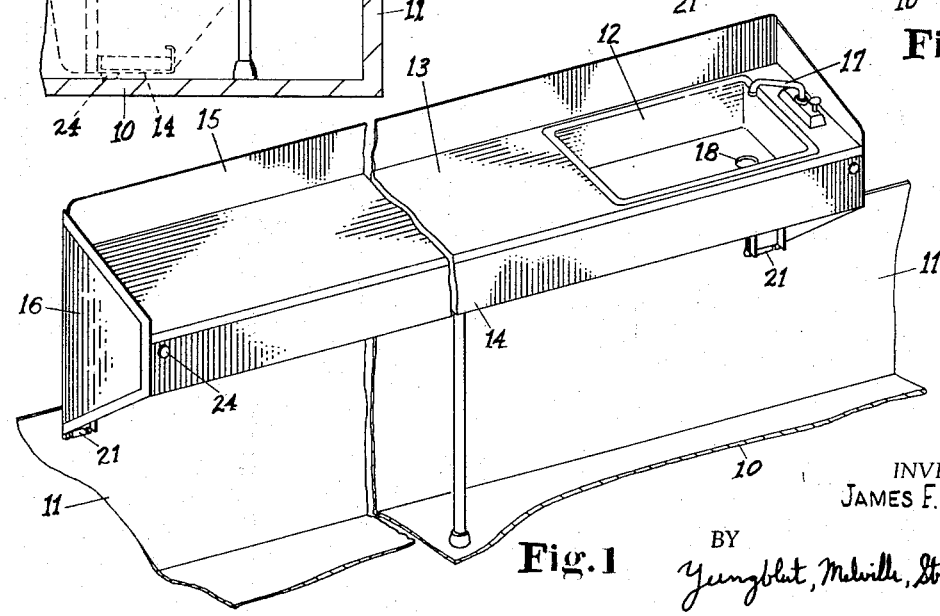
INVENTOR.
JAMES F. MARIOL,
BY
Youngblut, Melville, Strasser & Foote
ATTORNEYS.

United States Patent Office 3,292,966
Patented Dec. 20, 1966

3,292,966
TRAILER KITCHEN
James F. Mariol, Cincinnati, Ohio, assignor to Ward Manufacturing, Inc., Hamilton, Ohio, a corporation of Ohio
Filed Jan. 14, 1965, Ser. No. 425,429
4 Claims. (Cl. 296—23)

This invention resides in the provision of a novel trailer kitchen; more specifically, it relates to a foldable sink and counter particularly suitable for use with a low profile, folding canvas top camping trailer.

Camping trailers have become extremely popular in recent years. Among the more popular are those which have a very low profile and which are generically described as a folding canvas top trailer. The low profile is highly desirable in that it makes the trailer extremely easy to trail behind an automobile, pickup truck or the like. As the description implies, when the trailer has been brought to the camping site, not only is the lower structure thereof expandable but also it incorporates a tent like top which, when erected, provides a large enclosed living area.

As indicated, the lower structure of these camping trailers is generally of some metal or the like and is expandable laterally and/or longitudinally to provide the basic "ground floor" living area. As also indicated, the structure, in use, is completed by erecting the tent like top. This tent like "top" also defines a major part of the erected side walls. Thus, in use, the trailer will have a rigid bottom and short rigid side walls, the upper part of the side walls and the top being defined by the tent portion of the structure.

Although camping trailers of the type generally described have become quite popular, they do possess certain drawbacks. The very low profile nature of the trailer, which is a desirable arrangement for many purposes, does present certain difficulties. Thus, as the camping trailer has increased in popularity so has the demand for the inclusion therein of "modern conveniences." Among such desired conveniences are trailer kitchens including sinks and counters. Heretofore it has been the practice to include a permanent sink and/or counter located on the floor of the trailer adjacent one of the permanent vertical side walls. Because of the low profile mentioned, this meant that the user either had to get down on his knees, or to stoop considerably, in order to make use of the sink. This obviously is not a desirable arrangement.

Accordingly, it is an object of this invention to provide an arrangement wherein the various facilities desired in a camping trailer are provided in such manner that they are operable at conventional heights as would, for example, occur in the normal home.

Briefly stated, this invention solves the problem by arranging the particular kitchen or camping facility involved so that during transportation it will rest on the trailer floor, extending thereacross either laterally or longitudinally, such facility being pivotally mounted so that it may be moved to an upright, vertical position when in use. The bodies of these camping trailers are wide enough and long enough to accommodate a full sized facility when it rests horizontally on the trailer floor. Preferably the facility does not have to be made in its full vertical dimension, rather, it may be hinged to the top of the relatively low permanent side wall so that it may rest on the floor during transportation and pivoted to upright position when in use, the lower permanent side wall in conjuction with the facility giving the required overall height to the working surface of the facility when in use. In another arrangement the facility itself is in effect made full size and pivoted to the floor of the trailer at a distance from a side wall thereof substantially equal to the thickness of the facility. This facility will normally lie on the floor of the trailer as it is moved from place to place. In use the facility is simply tilted to its vertical position wherein the rear wall thereof will be adjacent a side wall of the trailer and the height will be that provided by the facility itself, the floor dimensions of the trailer permitting a facility of a height comparable to that found in the home.

With these general descriptions, objects and advantages in mind, the invention will now be described more specifically with reference to the accompanying drawings wherein like numerals are employed to designate like parts and wherein:

FIGURE 1 is a perspective view, with parts broken away, showing the preferred form of the invention and its relationship to the trailer floor and wall;

FIGURE 2 is a cross section through the arrangement shown in FIGURE 1 and showing additionally the position of the facility, in dotted lines, as occupied by it when the trailer is transported from place to place;

FIGURE 3 is an exploded perspective view showing a specific manner in which the facility of FIGURES 1 and 2 may be constructed;

FIGURE 4 is a view of a facility generally similar to that depicted in FIGURES 1 through 3 but disclosing a variation in the manner by which it is hinged to the low profile permanent side wall of the trailer; and FIGURE 5 is a perspective view of a modification of the invention wherein the facility is constructed "full size" and hinged to the trailer floor.

Referring first to FIGURE 1 the trailer floor is generally indicated at 10 and a side wall at 11. This side wall 11 may be one that either parallels the trailer axis or is at right angles thereto, depending somewhat on the manner in which the various trailer facilities, such as beds and the like, are arranged. Thus, for example, in some camping trailers the beds are designed to slide laterally of the trailer while in other arrangements the beds slide longitudinally thereof. The particular trailer kitchen facility illustrated in these FIGURES 1 through 3 is that which may be broadly described as a sink and counter. This facility comprises the sink 12, counter 13, front piece 14, splash guard 15 and end walls 16. The sink includes a faucet arrangement generally indicated at 17 which is designed to be connected to a suitable water supply (not shown). A drain is indicated at 18.

Referring now particularly to FIGURE 3, the arrangement of the basic counter section, which includes the sink 12, is shown. In addition to the parts previously described there are a pair of channel members 19, a horizontal support member 20 and hinges 21. Each channel member 19 fits within the flanged side wall 16, one at either end of the counter. The support channel also fits within these flanged side walls 16 and the various members 16, 19 and 20 may be welded together or otherwise suitably secured. It is contemplated that the front piece 14 may be welded to the two side elements 16. The counter 13, and splash guard 15, may then be secured to the members 20 and 14 in any desired manner. Preferably the hinges 21 are secured to the back side of the channel members 19.

Pivotally mounted in a U-shaped bracket 22 secured to the underside of the counter section 13 is a leg member 23. Preferably this leg is located substantially centrally of the sink and counter. It is to be understood, however, that additional legs may be utilized if desired.

The sink and counter arrangement, considered as an integral unit and including all of its parts 12 through 23, is hingedly connected adjacent the topmost part of the side wall 11 by means of the hinges 21 which are secured to said side wall.

When the trailer is being transported from place to place the sink and counter arrangement will assume the position shown in dotted lines in FIGURE 2. The leg 23 will be parallel and adjacent to the counter member 13 and the member 14, with its rest button 24, will abut the floor 11. When the trailer is brought to the camp destination the sink and counter may be swung to the full line position of FIGURE 2 merely by moving it about the hinged connection 21 and swinging the leg 23 to its vertical position.

It will be recalled that one of the important objects of the invention is to arrange the sink 12 and counter 13 so that, in use, these members are located at substantially the same height as are similar members in a home. In this modification such object is readily achieved by, in effect, using the side wall 11 as a part of the base of the counter. The desired height is then obtained simply by constructing the sink and counter so that the distance from the base of the hinge 21 to the top of the counter 13, coupled with the height of the trailer side wall 11, brings the counter 13 to the desired height in its erected position. There is plenty of room across the trailer floor 10, from the side wall 11, to permit making this distance from the base of hinge 21 to the top of counter 13 any distance desired.

The arrangement of FIGURE 4 is quite similar to that of FIGURES 1 through 3 differing in the manner in which the hinge elements 21 are arranged with respect to the trailer side wall 11. Thus, instead of the hinges 21 being secured directly to the side wall 11, they are fastened to a support bar 25 which in turn is secured in any desired manner to such side wall 11.

In the arrangement of FIGURE 5 the kitchen facility, again indicated generally as including a sink and counter, but including also a cabinet section 26, is hinged directly to the floor 10 of the trailer rather than to the side wall 11. In its vertical position as illustrated, the rear of the facility is adjacent the side wall 11 and the hinges are positioned as shown. When the trailer is being transported, the facility will have been pivoted to a horizontal position wherein the forward part of the sink, counter and cabinet will rest on the trailer floor, rest button 24 again being utilized. Most camping trailers are sufficiently wide or long to permit making the sink, counter and cabinet to the height desired and locating it on the floor in the manner indicated. It will be apparent, however, that the arrangement of FIGURE 5 does require more floor space and this may not always be available, thus the arrangements of FIGURES 1 through 4 are ordinarily preferred.

It should be understood that although this invention has been described as embodied in certain particular structures and arrangements, the invention is not to be limited to these specific structures and arrangements except insofar as they are specifically set forth in the subjoined claims. It is believed that modifications may occur to those skilled in the art and which modifications will fall within the scope and spirit of the invention as described, shown and claimed herein.

The embodiments of the invention in which an exclusive property or privilege is claimed are defined as follows:

1. A kitchen facility and the like, adapted for use in a camping trailer having a floor and low side walls, which facility is provided with hinge means connecting said facility to a said side wall adjacent the top of said side wall, said facility normally occupying a position wherein it rests on the trailer floor with the normal working area of the facility disposed vertically to the floor, said facility being pivotable from the floor about said hinge means to a position wherein the said working area is substantially parallel to the floor and at a higher elevation than that of the tops of said side walls, and leg means to support said facility from said floor when said facility is in such position that its working area is substantially parallel to said floor.

2. A facility in combination with a camping trailer having a floor and low side walls, said facility comprising a flat portion, brace means extending from said flat portion, hinge means attached to said brace means, said hinge means also being attached adjacent the top of a said side wall, the depth of said flat portion being substantially the same dimension as that from the floor to the place at which the hinge means is attached to the side wall, whereby said flat portion may occupy a position on the floor and substantially vertical thereto, and whereby said flat portion may be moved to a position wherein it occupies a position at an elevation above said side wall and substantially parallel to said floor, and leg means pivotally connected to the facility to hold said flat portion in its parallel position, said leg means being movable to an out of the way position so as to permit said flat portion to occupy a position on the floor.

3. A foldable kitchen facility for a camping trailer having a floor and low side walls, said facility comprising a substantially float sink and counter section, brace means extending from said section to the top of a said side wall, hinge means connecting said brace means to said side wall, the depth of said section being substantially equal to the height of said side wall, whereby said section may be pivoted about said hinge means so that it rests on said floor substantially vertical thereto and whereby said section may be pivoted about said hinge means so that it extends above said side wall substantially parallel to the floor, and support means connected to said section to hold said section in its parallel position.

4. The facility of claim 3 in which said section includes a splash guard extending at right angles from said section, said brace means comprising a pair of rigid members, and a pair of side elements, said section, splash guard, rigid members, and side elements comprising an integral unit, and said support means comprising a leg movable to an out of the way position when said section is moved to that position wherein it rests on said floor.

References Cited by the Examiner

UNITED STATES PATENTS

| | | | |
|---|---|---|---|
| 2,193,352 | 3/1940 | Thomas | 296—23 |
| 2,501,027 | 3/1950 | Carmichael | 296—23 |
| 2,523,533 | 9/1950 | Hurwitz | 296—23 |
| 2,639,185 | 5/1953 | Brumbaugh | 296—23 |

BENJAMIN HERSH, *Primary Examiner.*

P. GOODMAN, *Assistant Examiner.*